(12) United States Patent
Srivastava et al.

(10) Patent No.: US 12,529,846 B2
(45) Date of Patent: Jan. 20, 2026

(54) WAVEGUIDE CORES SURROUNDED BY AN AIRGAP

(71) Applicant: GlobalFoundries U.S. Inc., Malta, NY (US)

(72) Inventors: Ravi Prakash Srivastava, Clifton Park, NY (US); Yusheng Bian, Ballston Lake, NY (US); Shesh Mani Pandey, Saratoga Springs, NY (US); Vibhor Jain, Essex Junction, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 353 days.

(21) Appl. No.: 18/079,523

(22) Filed: Dec. 12, 2022

(65) Prior Publication Data

US 2024/0192442 A1   Jun. 13, 2024

(51) Int. Cl.
*G02B 6/122* (2006.01)
*G02B 6/136* (2006.01)
*G02B 6/30* (2006.01)

(52) U.S. Cl.
CPC ........... *G02B 6/1228* (2013.01); *G02B 6/136* (2013.01); *G02B 6/305* (2013.01)

(58) Field of Classification Search
CPC ...... G02B 6/12; G02B 6/12002; G02B 6/122; G02B 6/1223; G02B 6/1228; G02B 6/13; G02B 6/136; G02B 6/14; G02B 6/305; G02B 6/42; G02B 2006/12083; G02B 2006/12097; G02B 2006/12147
See application file for complete search history.

(56) References Cited

U.S. PATENT DOCUMENTS

| | | | |
|---|---|---|---|
| 9,588,293 B2 | 3/2017 | Ellis-Monaghan et al. | |
| 10,281,648 B2 * | 5/2019 | Burek | G02B 6/1223 |
| 10,571,633 B1 | 2/2020 | Chen et al. | |
| 10,585,241 B2 * | 3/2020 | Fathpour | G02B 6/1221 |
| 10,816,726 B1 | 10/2020 | Peng et al. | |
| 11,067,751 B2 | 7/2021 | Meagher et al. | |
| 11,215,756 B2 | 1/2022 | Bian et al. | |
| 11,366,269 B2 | 6/2022 | Bian | |
| 2009/0091038 A1 | 4/2009 | Chen et al. | |
| 2012/0076465 A1 | 3/2012 | Chen et al. | |

(Continued)

FOREIGN PATENT DOCUMENTS

| | | |
|---|---|---|
| JP | 2011180464 A | 9/2011 |
| JP | 2012112984 A | 6/2012 |

OTHER PUBLICATIONS

European Patent Office, Extended European Search Report and Opinion issued in European Patent Application No. 23204238.2 on Mar. 14, 2024; 8 pages.

(Continued)

*Primary Examiner* — John Bedtelyon
(74) *Attorney, Agent, or Firm* — Thompson Hine LLP; Anthony Canale

(57) ABSTRACT

Structures for an edge coupler and methods of forming a structure for an edge coupler. The structure comprises a substrate, a dielectric layer over the substrate, and a waveguide core over the substrate. The structure further comprises an airgap that extends at least partially through the dielectric layer and that surrounds a plurality of sides of a portion of the waveguide core.

17 Claims, 9 Drawing Sheets

(56) References Cited

U.S. PATENT DOCUMENTS

| | | | | |
|---|---|---|---|---|
| 2012/0328243 | A1* | 12/2012 | Fang | G02B 6/305 |
| | | | | 385/50 |
| 2013/0322816 | A1* | 12/2013 | Takahashi | G02B 6/262 |
| | | | | 385/27 |
| 2016/0187579 | A1* | 6/2016 | Henze | G02B 6/1223 |
| | | | | 385/132 |
| 2017/0293073 | A1* | 10/2017 | Chen | G02B 6/138 |
| 2020/0116930 | A1 | 4/2020 | Kannan et al. | |
| 2021/0278611 | A1 | 9/2021 | Sahin et al. | |
| 2022/0011507 | A1 | 1/2022 | Chen et al. | |
| 2022/0229250 | A1 | 7/2022 | Bian et al. | |
| 2022/0252785 | A1 | 8/2022 | Bian et al. | |
| 2022/0252790 | A1 | 8/2022 | Dezfulian et al. | |
| 2023/0231364 | A1* | 7/2023 | Meyer | H01S 5/3419 |
| | | | | 372/45.01 |
| 2024/0036263 | A1* | 2/2024 | Eid | G02B 6/305 |

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Art No. 8200611, doi: 10.1109/JSTQE.2019.2908790 (Sep.-Oct. 2019).

M. Rakowski et al., "45nm CMOS—Silicon Photonics Monolithic Technology (45CLO) for next-generation, low power and high speed optical interconnects," in Optical Fiber Communication Conference (OFC), OSA Technical Digest (Optical Society of America, 2020), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2 (2020).

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group), paper M5A.2 (2021).

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020. 9252280.

Y. Bian et al., "Integrated Laser Attach Technology on a Monolithic Silicon Photonics Platform," 2021 IEEE 71st Electronic Components and Technology Conference (ECTC), 2021, pp. 237-244, doi: 10.1109/ECTC32696.2021.00048.

B. Peng et al., "A CMOS Compatible Monolithic Fiber Attach Solution with Reliable Performance and Self-alignment," In Optical Fiber Communication Conference (OFC), OSA Technical Digest (Optica Publishing Group, 2020), paper Th31.4 (2020).

Y. Bian et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

Bian, Yusheng et al., "Enlarged Waveguide for Photonic Integrated Circuit Without Impacting Interconnect Layers" filed on Oct. 28, 2020 as a U.S. Appl. No. 17/082,291.

Sporer, Ryan et al., "Photonics Chips Including a Fully-Depleted Silicon-on-Insulator Field-Effect Transistor" filed on Aug. 5, 2021 as a U.S. Appl. No. 17/394,770.

Pandey, Shesh Mani et al., "Multiple-Core Heterogeneous Waveguide Structures Including Multiple Slots" filed on Jan. 31, 2022 as a U.S. Appl. No. 17/588,440.

Krishnamurthy, Subramanian et al., "Optical Power Splitters With a Tailored Splitting Ratio" filed on Jun. 25, 2021 as a U.S. Appl. No. 17/358,255.

Sahin, Asli et al., "Photonics Integrated Circuit With Silicon Nitride Waveguide Edge Coupler" filed on Feb. 19, 2021 as a U.S. Appl. No. 17/179,532.

Bian, Yusheng "Edge Couplers With Metamaterial Rib Features" filed on Jul. 7, 2021 as a U.S. Appl. No. 17/369,253.

Bian, Yusheng "Edge Couplers With Confining Features" filed on Oct. 4, 2021 as a U.S. Appl. No. 17/493,260.

Jolt, Judson R. et al., "Silicon-on-Insulator Chip Structure With Substrate-Embedded Optical Wavuduide and Method" filed on Dec. 23, 2020 as a U.S. Appl. No. 17/131,997.

Etavic, Theodore et al., "Hybrid Edge Couplers With Stacked Inverse Tapers" filed on Aug. 19, 2021 as a U.S. Appl. No. 17/406,773.

Bian, Yusheng "Waveguides and Edge Couplers With Multiple-Thickness Waveguide Cores" filed on Apr. 26, 2022 as a U.S. Appl. No. 17/729,244.

Bian, Yusheng et al. "Confining Features for Mode Shaping of Lasers and Coupling With Silicon Photonic Components" filed on Feb. 4, 2021 as a U.S. Appl. No. 17/167,201.

Bian, Yusheng et al., "Spot-Size Converters With Angled Facets" filed on Feb. 24, 2022 as a U.S. Appl. No. 17/679,188.

Sporer, Ryan et al., "Cladding Structure in the Back End of Line of Photonics Chips" filed on Jun. 6, 2022 as a U.S. Appl. No. 17/805,686.

European Patent Office; Communication pursuant to Article 94(3) EPC issued in European Patent Application No. 23204238.2 on Jul. 3, 2025; 7 pages.

* cited by examiner

US 12,529,846 B2

WAVEGUIDE CORES SURROUNDED BY AN AIRGAP

BACKGROUND

The disclosure relates to photonics chips and, more specifically, to structures for an edge coupler and methods of forming a structure for an edge coupler.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

An edge coupler, also known as a spot-size converter, is an optical component that is commonly used for coupling light of a given mode from a light source, such as a laser or an optical fiber, to other optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected to another section of the waveguide core that routes the light to the optical components on the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed around the tip of the inverse taper. As its width increases, the inverse taper can support the entire incident mode and confine the electromagnetic field.

Improved structures for an edge coupler and methods of forming a structure for an edge coupler are needed.

SUMMARY

In an embodiment of the invention, a structure comprises a substrate, a dielectric layer over the substrate, and a waveguide core over the substrate. The structure further comprises an airgap that extends at least partially through the dielectric layer and that surrounds a plurality of sides of a portion of the waveguide core.

In an embodiment of the invention, a method comprises forming a waveguide core over a substrate. The waveguide core includes a plurality of sides, and a dielectric layer is positioned over the substrate. The method further comprises forming an airgap that extends at least partially through the dielectric layer and that surrounds the plurality of sides of a portion of the waveguide core.

BRIEF DESCRIPTION OF THE DRAWINGS

The accompanying drawings, which are incorporated in and constitute a part of this specification, illustrate various embodiments of the invention and, together with a general description of the invent ion given above and the detailed description of the embodiments given below, serve to explain the embodiments of the invention. In the drawings, like reference numerals refer to like features in the various views.

DETAILED DESCRIPTION

Figure 1:
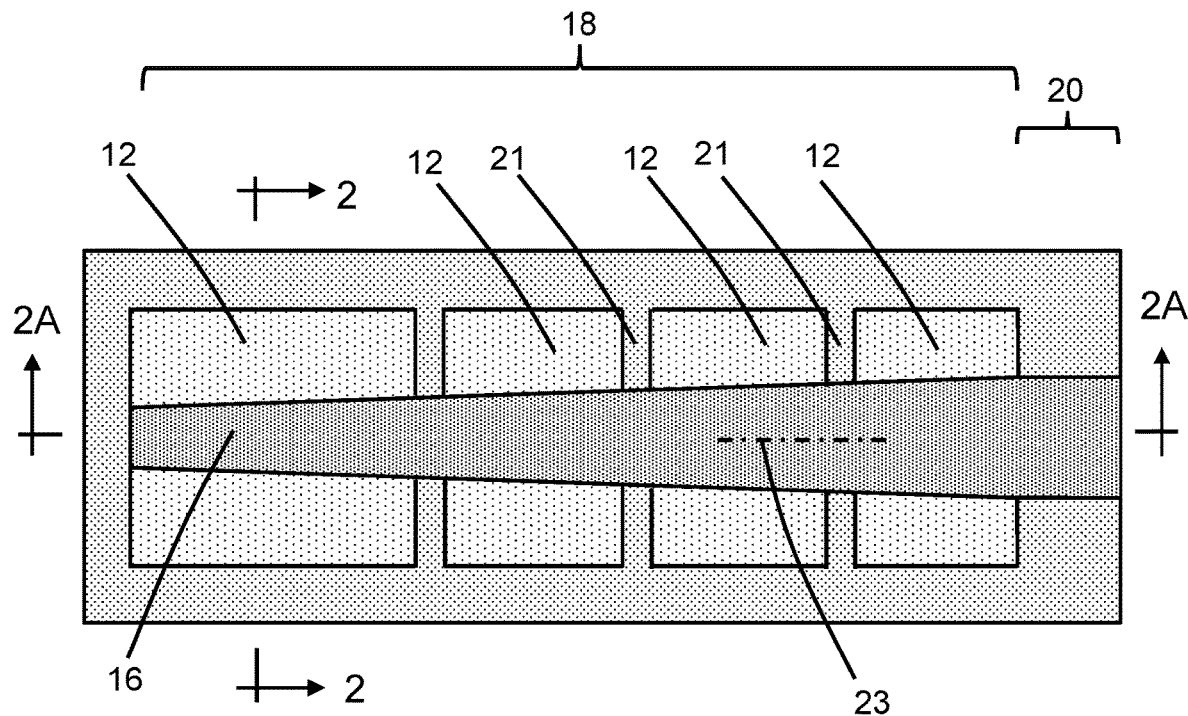
FIG. 1 is a top view of a structure at an initial fabrication stage of a processing method in accordance with embodiments of the invention.
Figure 2:
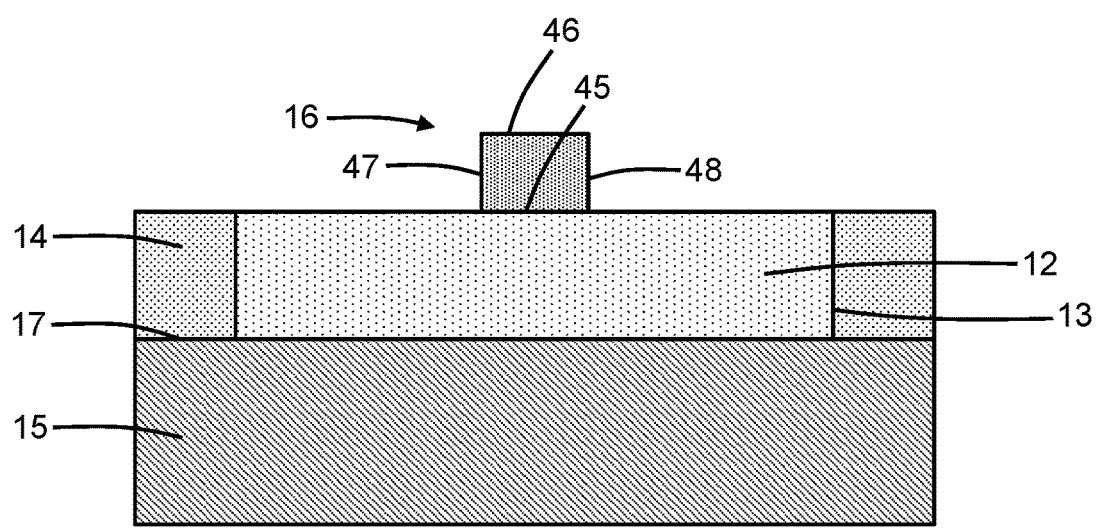
FIG. 2 is a cross-sectional view of the structure taken generally along line 2-2 in FIG. 1.
Figure 2A:
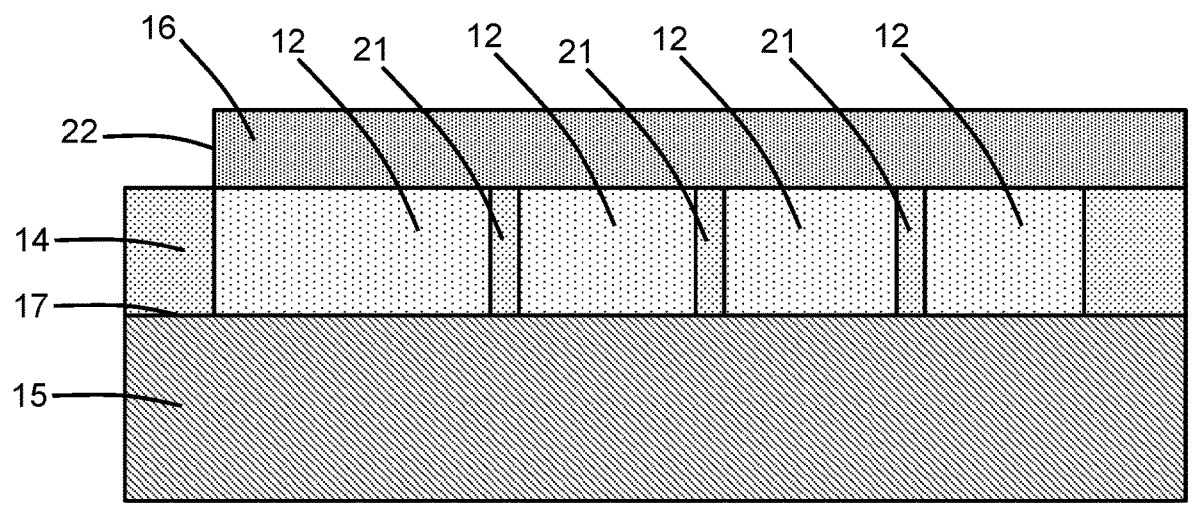
FIG. 2A is a cross-sectional view of the structure taken generally along line 2A-2A in FIG. 1.

With reference to FIGS. 1, 2, 2A and in accordance with embodiments of the invention, removable layers 12 may be formed that are positioned in a series of trenches 13 defined in a dielectric layer 14. The trenches 13 may be patterned in the dielectric layer 14 by lithography and etching processes. In an embodiment, the trenches 13 may penetrate fully through the dielectric layer 14 to a top surface 17 of a substrate 15. In an embodiment, each removable layer 12 may fully fill one of the trenches 13.

The removable layers 12 may be comprised of an energy removal film material that is removable by an activation treatment. In an embodiment, the removable layers 12 may be comprised of an organic ($C_xH_yO_z$) compound, such as a silicon-based organic compound that is deposited by plasma-enhanced chemical vapor deposition or applied by a spin-on process. In an embodiment, the energy removal film material constituting the removable layers 12 may be comprised of a porogen material, which is a sacrificial organic-based material that is converted from a solid state to a gaseous state when subjected to an activation treatment including heat energy and/or electromagnetic radiation. The removable layers 12 may be etched back and/or polished to have respective top surfaces that are coplanar with a top surface of the dielectric layer 14.

In an embodiment, the dielectric layer 14 may be comprised of a dielectric material, such as silicon dioxide, and the substrate 15 may be comprised of a semiconductor material, such as single-crystal silicon. In an embodiment, the dielectric layer 14 may be a buried oxide layer of a silicon-on-insulator substrate from which the device layer has been removed.

Adjacent removable layers 12 are separated by intact sections 21 of the dielectric layer 14, which are masked when the trenches 13 are patterned. The intact sections 21 of the dielectric layer 14, which are spaced apart along the length of the waveguide core 16, define pillars of dielectric material that project upwardly from the top surface 17 of the substrate 15 to different portions of the waveguide core 16.

In an embodiment, each section 21 of the dielectric layer 14 may fully separate an adjacent pair of the removable layers 12.

A waveguide core 16 may be formed that extends longitudinally across the removable layers 12 and the sections 21 of the dielectric layer 14. The waveguide core 16 may include a tapered section 18 and a section 20 that is connected to the tapered section 18. The tapered section 18 of the waveguide core 16 may terminate at an end 22, and the section 20, which may be non-tapered, may be coupled with optical components on a photonics chip. The tapered section 18 may define a taper having a width that increases with increasing distance from the terminating end 22. In an embodiment, the tapered section 18 may be an inverse taper characterized by a gradual increase in width along a mode propagation direction in the waveguide core 16. In an embodiment, the width of the tapered section 18 may increase linearly with increasing distance from the terminating end 22. In an alternative embodiment, the width of the tapered section 18 may vary based on a non-linear function, such as a quadratic function, a cubic function, a parabolic function, a sine function, a cosine function, a Bezier function, or an exponential function. In an embodiment, the tapered section 18 may include a single stage of tapering with a uniform taper angle. In an alternative embodiment, the tapered section 18 may taper in multiple stages each having a different taper angle.

The waveguide core 16 may be aligned along a longitudinal axis 23. The removable layers 12 and the sections 21 of the dielectric layer 14 are arranged along the longitudinal axis 23 of the waveguide core 16. The removable layers 12 alternate with the sections 21 of the dielectric layer 14 along the longitudinal axis 23 of the waveguide core 16. The waveguide core 16 may have a bottom side 45 adjacent to the removable layers 12 and the sections 21 of the dielectric layer 14, a top side 46 opposite to the bottom side 45, and opposite lateral sides 47, 48 that directly connect the bottom side 45 to the top side 46. In an embodiment, the bottom side 45 of the waveguide core 16 may adjoin the removable layers 12 and the sections 21 of the dielectric layer 14.

In an embodiment, the waveguide core 16 may be comprised of a material having a refractive index that is greater than the refractive index of silicon dioxide. In an embodiment, the waveguide core 16 may be comprised of a dielectric material, such as silicon nitride, silicon oxynitride, or aluminum nitride. In alternative embodiments, other materials, such as a polymer or a III-V compound semiconductor, may be used to form the waveguide core 16.

In an embodiment, the waveguide core 16 may be formed by patterning a layer comprised of its constituent material with lithography and etching processes. In an embodiment, an etch mask may be formed by a lithography process over the layer, and unmasked sections of the deposited layer may be etched and removed with an etching process. The shape of the etch mask may determine the patterned shape of the waveguide core 16. In an alternative embodiment, a slab layer may be connected to a lower portion of the waveguide core 16. The slab layer may be formed when the waveguide core 16 is patterned, and the slab layer, which is positioned on the removable layers 12 and the sections 21 of the dielectric layer 14, may have a thickness that is less than the thickness of the waveguide core 16.

In alternative embodiments, additional waveguide cores may be arranged adjacent to the tapered section 18 of the waveguide core 16, such as a trident arrangement with the tapered section 18 of the waveguide core 16 positioned between a pair of added waveguide cores. In an alternative embodiment, the tapered section 18 of the waveguide core 16 may be segmented to define a subwavelength metamaterial structure and may include a central rib overlaid on the segments.

Figure 3:
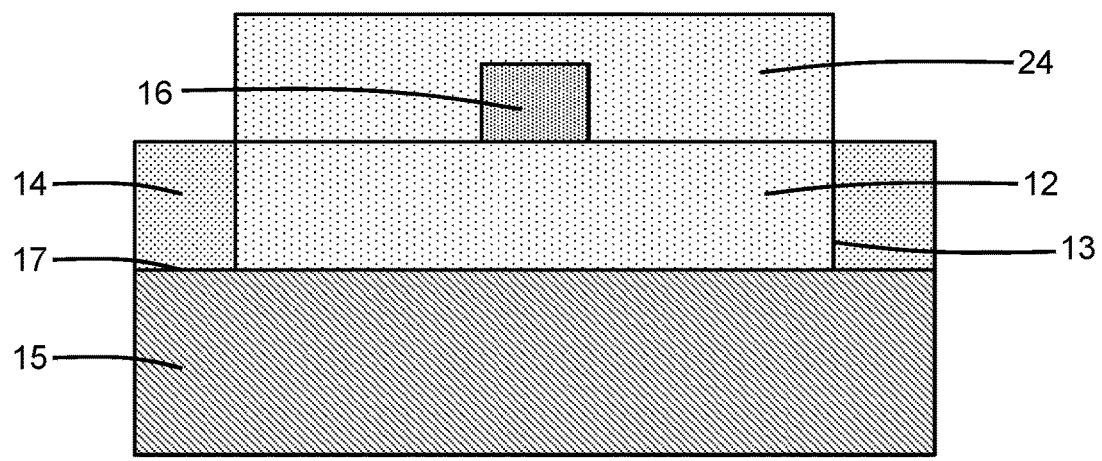
FIGS. 3, 3A are a cross-sectional views of the structure at a fabrication stage subsequent to FIGS. 2, 2A.
Figure 3A:
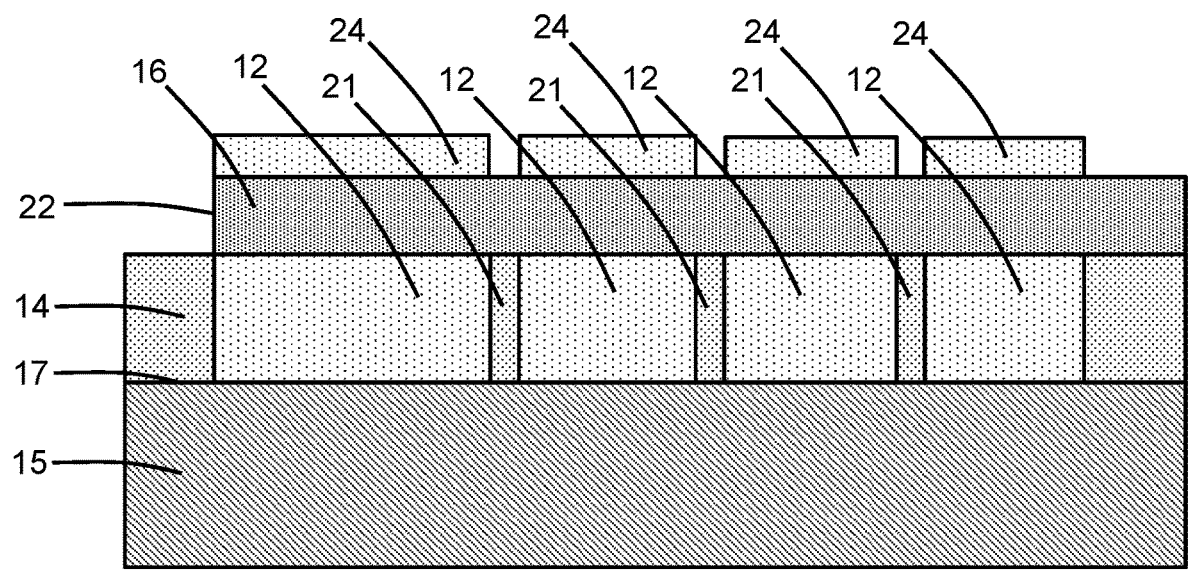

With reference to FIGS. 3, 3A in which like reference numerals refer to like features in FIGS. 2, 2A and at a subsequent fabrication stage, removable layers 24 may be formed and patterned by lithography and etching processes. The removable layers 24 may be comprised of an energy removal film material that is removable by an activation treatment. In an embodiment, the removable layers 12 may be comprised of an organic ($C_xH_yO_z$) compound, such as a silicon-based organic compound that is deposited by, for example, plasma-enhanced chemical vapor deposition or applied by a spin-on process. In an embodiment, the energy removal film material constituting the removable layers 24 may be comprised of a porogen material, which is a sacrificial organic-based material that is converted from a solid state to a gaseous state when treated with heat energy and/or electromagnetic radiation. In an embodiment, the removable layers 12 and the removable layers 24 may be comprised of the same energy removal film material.

The patterned removable layers 24 are disposed over the removable layers 12 and the waveguide core 16, and the removable layers 12, 24 are collectively positioned above the top surface 17 of the substrate 15. Adjacent pairs of the removable layers 24 are separated by gaps. Each removable layer 24 may be arranged in a vertical direction over one of the removable layers 12, and the gaps may be registered with the sections 21 of the dielectric layer 14. Portions of the waveguide core 16 are surrounded by the removable layers 12 and the removable layers 24 with the exception of the locations of the sections 21 of the dielectric layer 14 arranged between the removable layers 12 and the gaps between the patterned removable layers 24.

Figure 4:
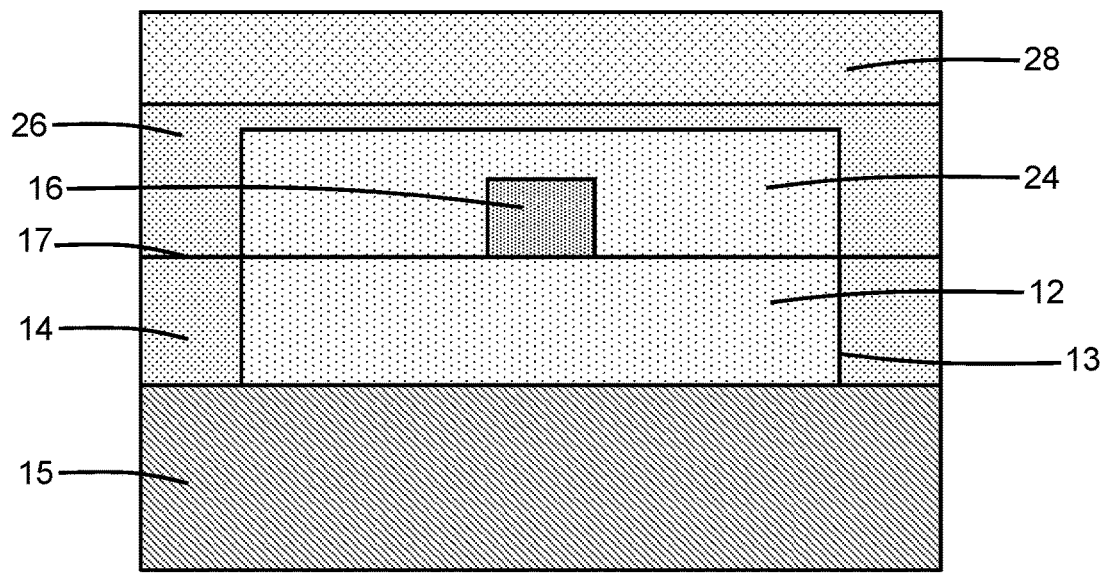
FIGS. 4, 4A are a cross-sectional views of the structure at a fabrication stage subsequent to FIGS. 3, 3A.
Figure 4A:
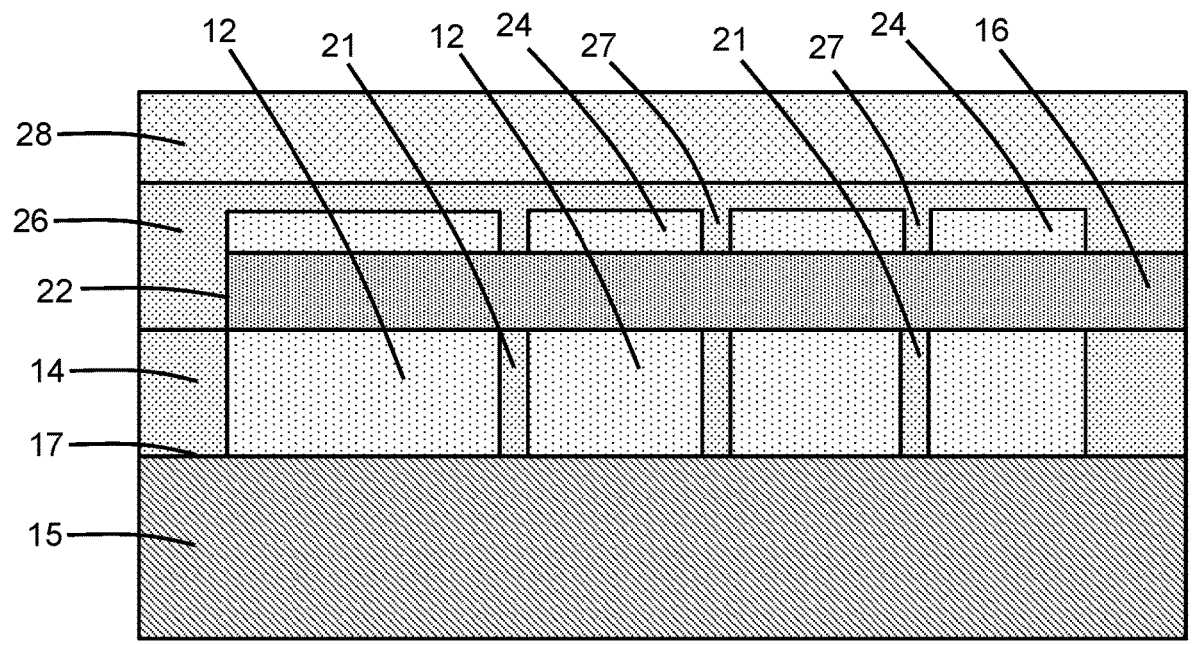

With reference to FIGS. 4, 4A in which like reference numerals refer to like features in FIGS. 3, 3A and at a subsequent fabrication stage, a dielectric layer 26 is formed over the removable layer 24. The dielectric layer 26 may be comprised of a dielectric material, such as silicon dioxide, having a refractive index that is less than the refractive index of the material constituting the waveguide core 16. The dielectric layer 26 may be deposited and planarized after deposition. Portions 27 of the dielectric layer 26 fill the gaps between adjacent pairs of the removable layers 24 with dielectric material. These portions 27 of the dielectric layer 26 may be aligned with the sections 21 of the dielectric layer 14. In combination, the portions 27 of the dielectric layer 26 and the sections 21 of the dielectric layer 14 surround portions of the waveguide core 16, and these surrounded portions of the waveguide core 16 alternate with the stacked removable layers 12, 24 along the longitudinal axis 23 of the waveguide core 16.

A back-end-of-line stack 28 may be formed over the dielectric layer 26. The back-end-of-line stack 28 may include multiple dielectric layers that are comprised of dielectric materials, such as silicon dioxide, silicon nitride, tetraethylorthosilicate silicon dioxide, or fluorinated-tetraethylorthosilicate silicon dioxide, and that are arranged in a layer stack.

Figure 5:
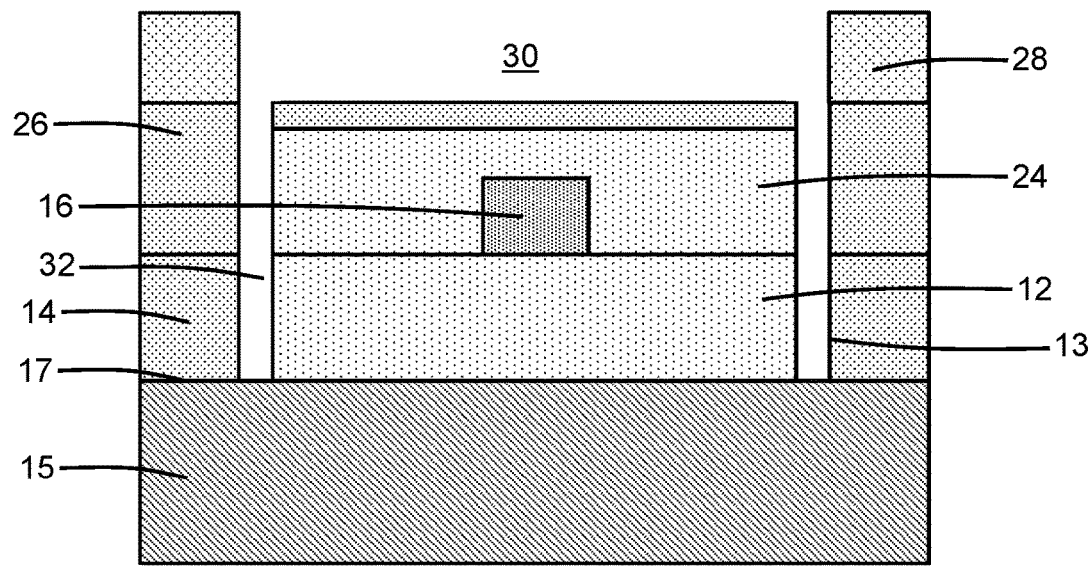
FIGS. 5, 5A are a cross-sectional views of the structure at a fabrication stage subsequent to FIGS. 4, 4A.

With reference to FIG. 5 in which like reference numerals refer to like features in FIG. 4 and at a subsequent fabrication stage, trenches 30 may be patterned in the back-end-of-line stack 28 that are located over the waveguide core 16 and the removable layers 12, 24. The trenches 30 may extend in depth to the dielectric layer 26. Openings 32 may be patterned by lithography and etching processes at the bottom of each trench 30 that penetrate through the dielectric layer 26 and the removable layers 12, 24 to the substrate 15.

Figure 5A:
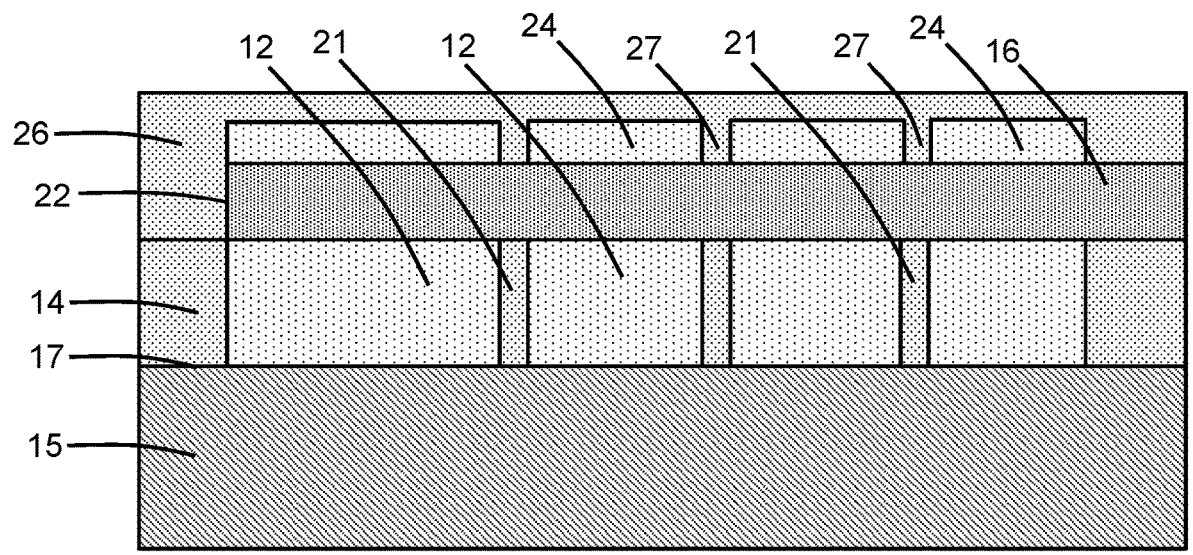
Figure 6:
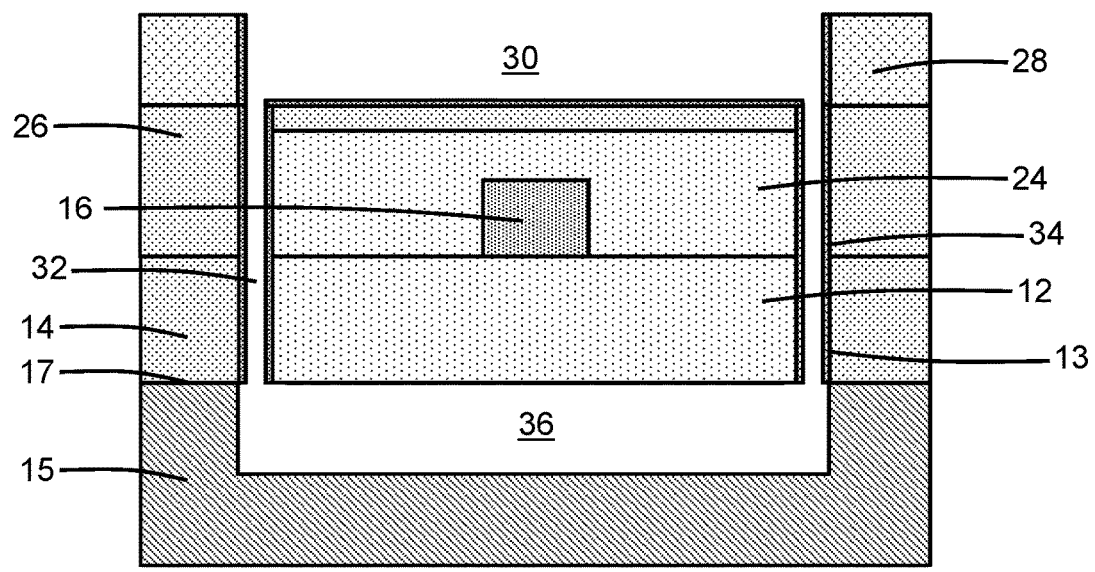
FIGS. 6, 6A are a cross-sectional views of the structure at a fabrication stage subsequent to FIGS. 5, 5A.
Figure 6A:
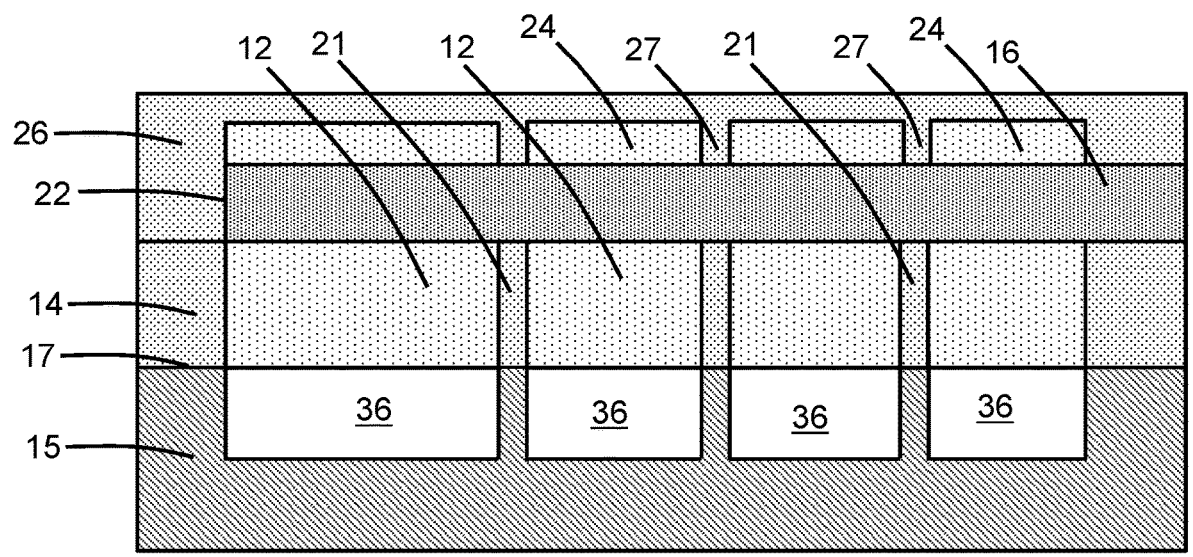

With reference to FIGS. 6, 6A in which like reference numerals refer to like features in FIGS. 5, 5A and at a subsequent fabrication stage, a dielectric layer 34 comprised of a dielectric material, such as silicon nitride, may be formed as a liner that coats the surfaces of the removable layers 12, 24 bordering the openings 32, as well as the surfaces bordering the trench 30. Cavities 36 may be formed by an etching process in the substrate 15 beneath the removable layers 12, 24. In an embodiment, the cavities 36 may be formed by a sulfur hexafluoride isotropic etching process or by a wet chemical etchant solution containing tetramethylammonium hydroxide (TMAH). The etching process may be controlled such that portions of the substrate 15 are preserved beneath the sections 21 of the dielectric layer 14. Another dielectric layer 38, similar to the dielectric layer 34, may be applied that coats the surfaces of the substrate 15 bordering the cavities 36. The dielectric pillars defined by the substrate-supported sections 21 of the dielectric layer 14 mechanically support the waveguide core 16 after formation of the cavities 36 and prevent collapse of the waveguide core 16. In an embodiment, the different cavities 36 may be isolated from each other by the sections 21 of the dielectric layer 14 that extend from the substrate 15 to different portions of the waveguide core 16. In an embodiment, the cavities 36 may be fully positioned below the top surface 17 of the substrate 15.

Figure 7:
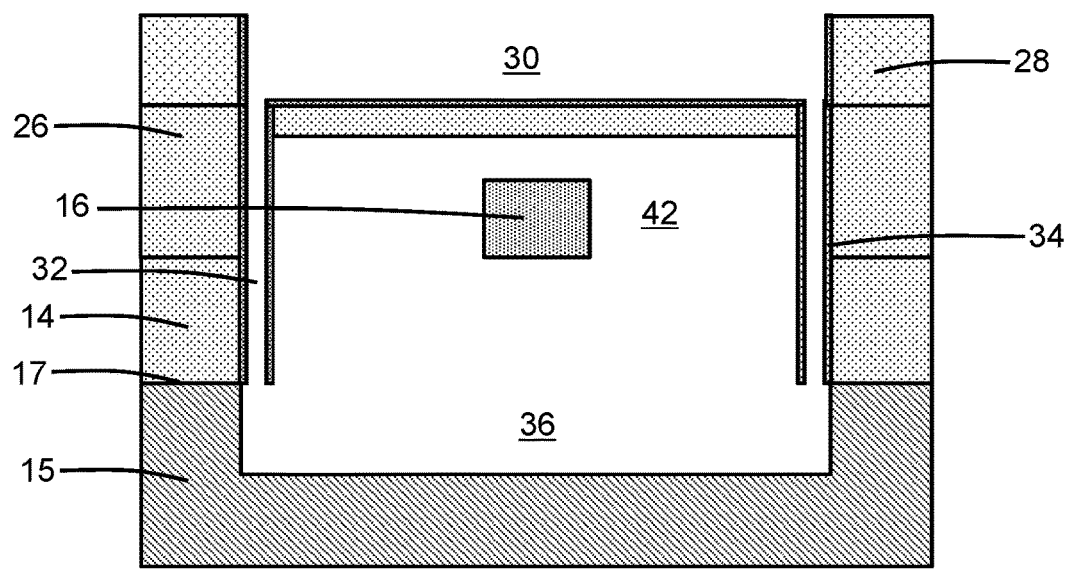
FIGS. 7, 7A are a cross-sectional views of the structure at a fabrication stage subsequent to FIGS. 6, 6A.
Figure 7A:
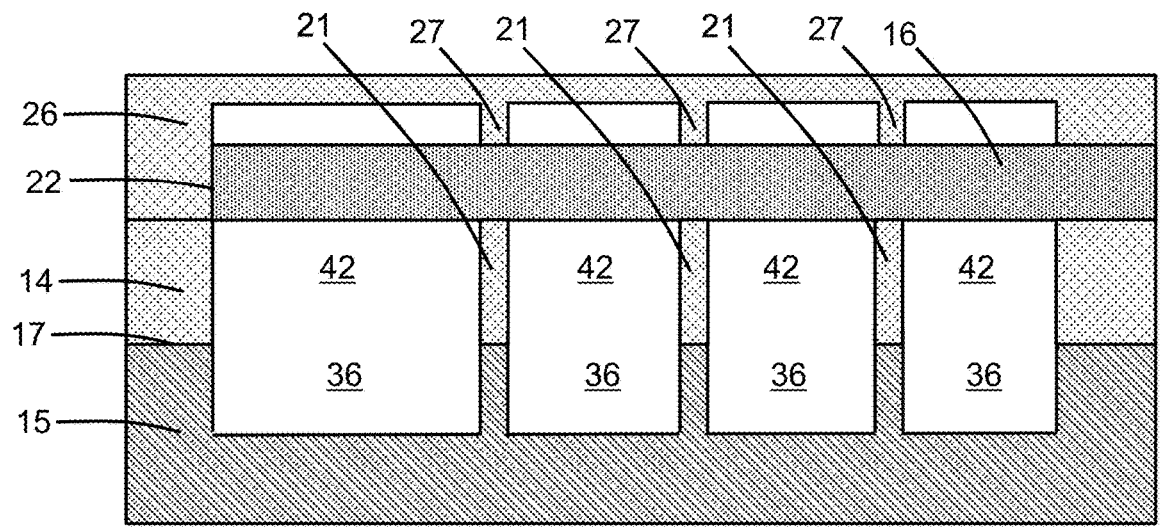

With reference to FIGS. 7, 7A in which like reference numerals refer to like features in FIGS. 6, 6A and at a subsequent fabrication stage, the energy removal film material contained in the removable layers 24 and the energy removal film material contained in the removable layers 12 may be removed to define cavities 42. In an embodiment, the cavities 42 may be respectively adjoined and continuous with the cavities 36. In an embodiment, the removable layers 12, 24 may be removed by an activation treatment causing the energy removal film material to decompose into a gas, which may be released to the ambient environment through the openings 32. In an embodiment, the activation treatment may be a heat treatment at a temperature in a range of 100° C. to 400° C. for a given time (i.e., longer times at lower temperatures) during which the energy removal film material may be volatized and converted to a gas or vapor that can escape through the openings 32. In an embodiment, the curing process may combine the thermal treatment that heats the removable layers 12, 24 with radiation exposure, such as exposure to radiation in the ultraviolet range of the electromagnetic spectrum. For example, thermal treatment may be performed at a temperature of 400° C. and may include continuous or intermittent exposure to ultraviolet radiation during heating.

The adjoined cavities 36, 42 define airgaps that may be filled by atmospheric air at or near atmospheric pressure, may be filled by another gas at or near atmospheric pressure, or may contain atmospheric air or another gas at a subatmospheric pressure (e.g., a partial vacuum). The airgaps defined by the adjoined cavities 36, 42 may be characterized by a permittivity or dielectric constant of near unity (i.e., vacuum permittivity), which is less than the dielectric constant of a solid dielectric material. The refractive index of the airgaps defined by the adjoined cavities 36, 42, which is proportional to the dielectric constant, is significantly lower than the refractive index of solid dielectric material.

The airgaps defined by the different pairs of cavities 36, 42 are longitudinally positioned along the length of the waveguide core 16. The airgaps extend through the dielectric layer 26 and fully through the dielectric layer 14. Each airgap surrounds a different portion of the waveguide core 16 on all sides 45, 46, 47, 48 (FIG. 2). In an embodiment, the portion of the waveguide core 16 surrounded by each airgap may be a portion of the tapered section 18. The airgaps provide low-index cladding that replaces higher-index solid dielectric material. The airgap-surrounded portions of the waveguide core 16 are longitudinally positioned between different sections 21 of the dielectric layer 14. In an embodiment, the airgap defined by each pair of adjoined cavities 36, 42 may be coextensive with all sides 45, 46, 47, 48 of the waveguide core 16.

Figure 8:
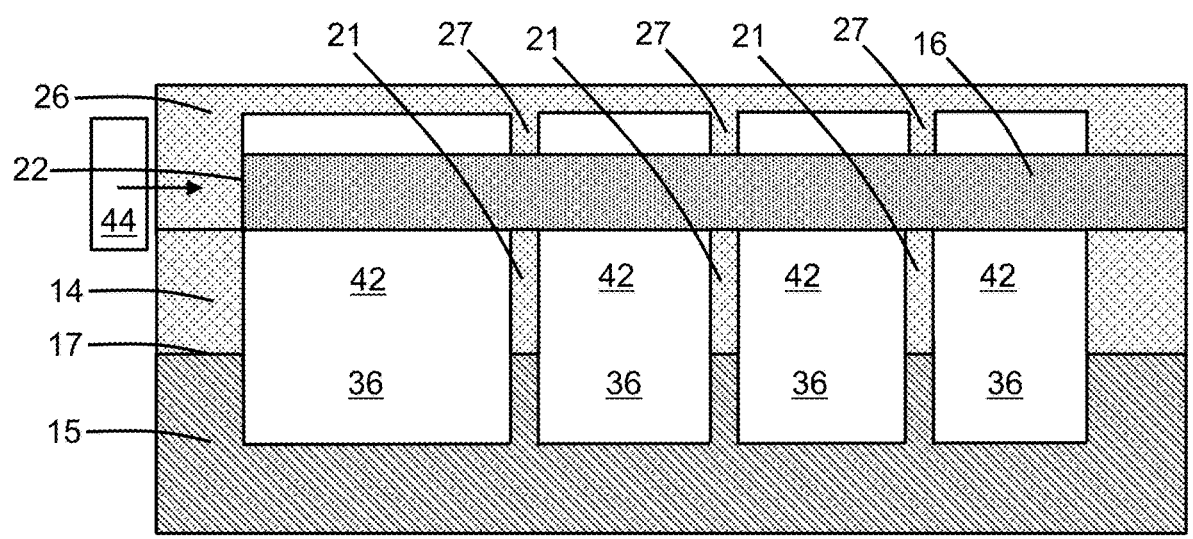
FIG. 8 is a cross-sectional view of a structure in accordance with embodiments of the invention.

With reference to FIG. 8 and in accordance with embodiments of the invention, the waveguide core 16 may be deployed in an edge coupler having a light source 44 configured to provide light (e.g., laser light) in a mode propagation direction, as indicated by the single-headed arrow, toward the end 22 of the tapered section 18 of the waveguide core 16. The edge coupler may be positioned at an edge of a photonics chip, and the edge coupler may be configured for coupling light from the light source 44 to optical components on the photonics chip. The light may have a given wavelength, intensity, mode shape, and mode size, and the edge coupler may provide spot-size conversion for the light. In an embodiment, the light source 44 may be a single-mode or multi-mode optical fiber that is positioned adjacent to the edge coupler. In an alternative embodiment, the light source 44 may be a semiconductor laser diode positioned adjacent to the tapered section 18 of the waveguide core 16, and the semiconductor laser diode may be attached to the substrate 15. In an alternative embodiment, the light source 44 may be a semiconductor optical amplifier that is positioned adjacent to the tapered section 18 of the waveguide core 16.

The space between the waveguide core 16 and the light source 44 may be filled by air or by an index-matching material, such as an adhesive. In an embodiment, the space inside the adjoined pair of cavities 36, 42 adjacent to the light source 44 may be filled at least in part by the adhesive.

Figure 9:
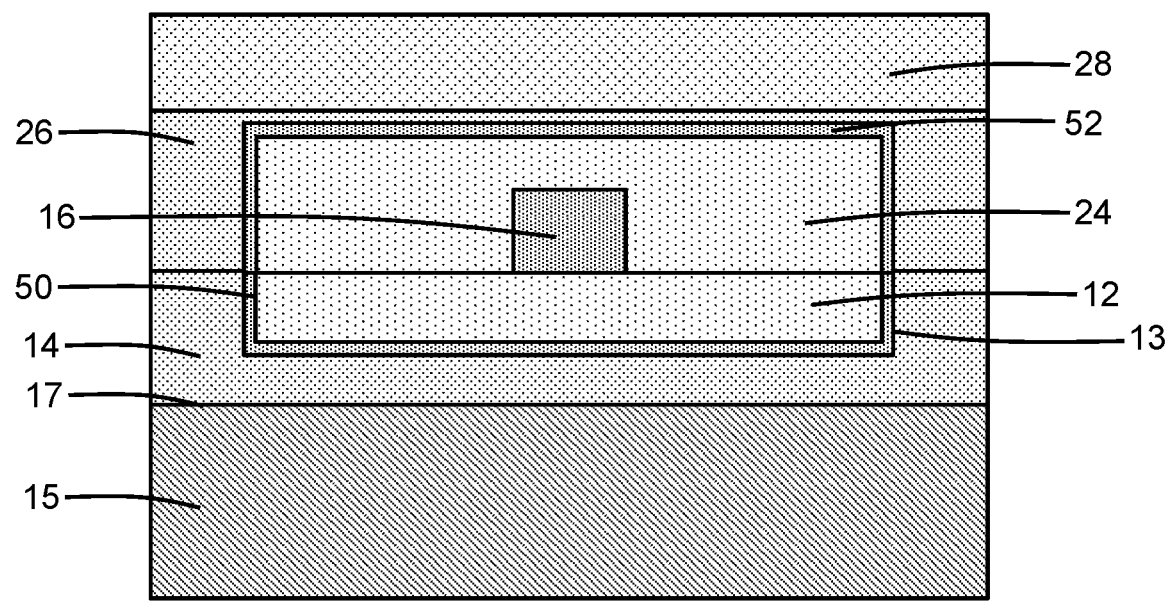
FIGS. 9-11 are cross-sectional views of a structure at successive fabrication stages of a processing method in accordance with alternative embodiments of the invention.

With reference to FIG. 9 and in accordance with embodiments of the invention, the removable layers 12 may be formed in trenches 13 that only penetrate partially through the dielectric layer 14. As a result, a residual portion of the dielectric layer 14 is preserved between the removable layers 12 and the substrate 15 at the bottom of each trench 13. A dielectric layer 50 may be formed as a coating inside the trenches before the removable layers 12 are formed. A dielectric layer 52 may also be formed after the removable layers 24 are formed. As a result, the removable layers 12, 24 may be encased inside the dielectric layer 50, 52, which may be comprised of a dielectric material such as silicon nitride.

Figure 10:
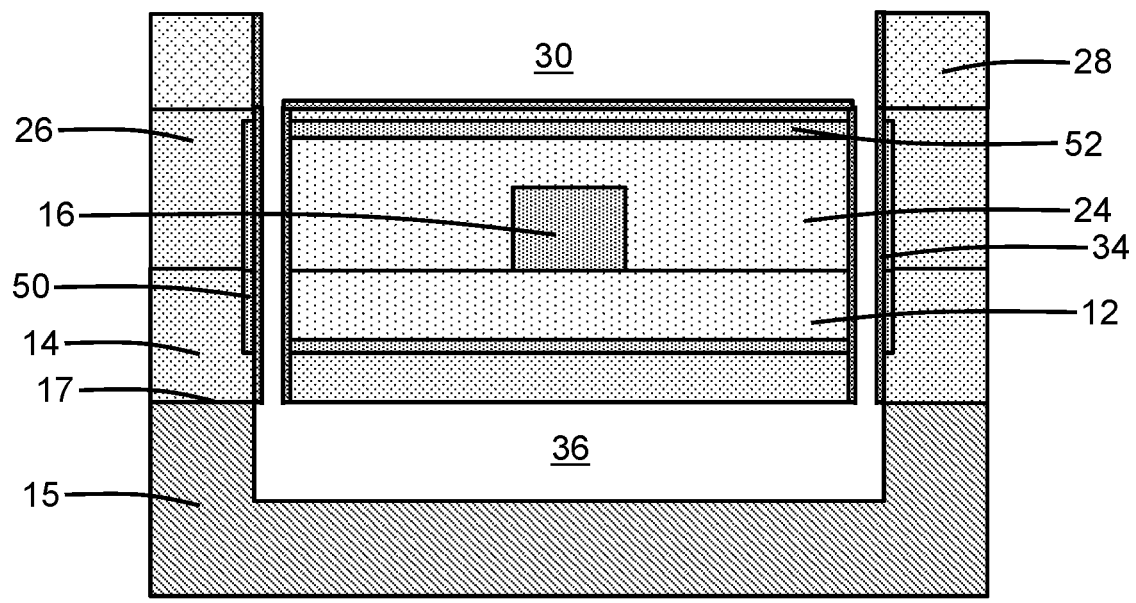

With reference to FIG. 10 in which like reference numerals refer to like features in FIG. 9 and at a subsequent fabrication stage, the trenches 30 and the openings 32 may be formed that extend to the substrate 15. The cavities 36 are formed in the substrate 15 with the access for the etching process provided by the trenches 30 and openings 32. The cavities 36 are located in the substrate 15 beneath the residual portion of the dielectric layer 14. In an embodiment, the cavities 36 may be fully positioned below the top surface 17 of the substrate 15 and the residual portion of the dielectric layer 14.

Figure 11:
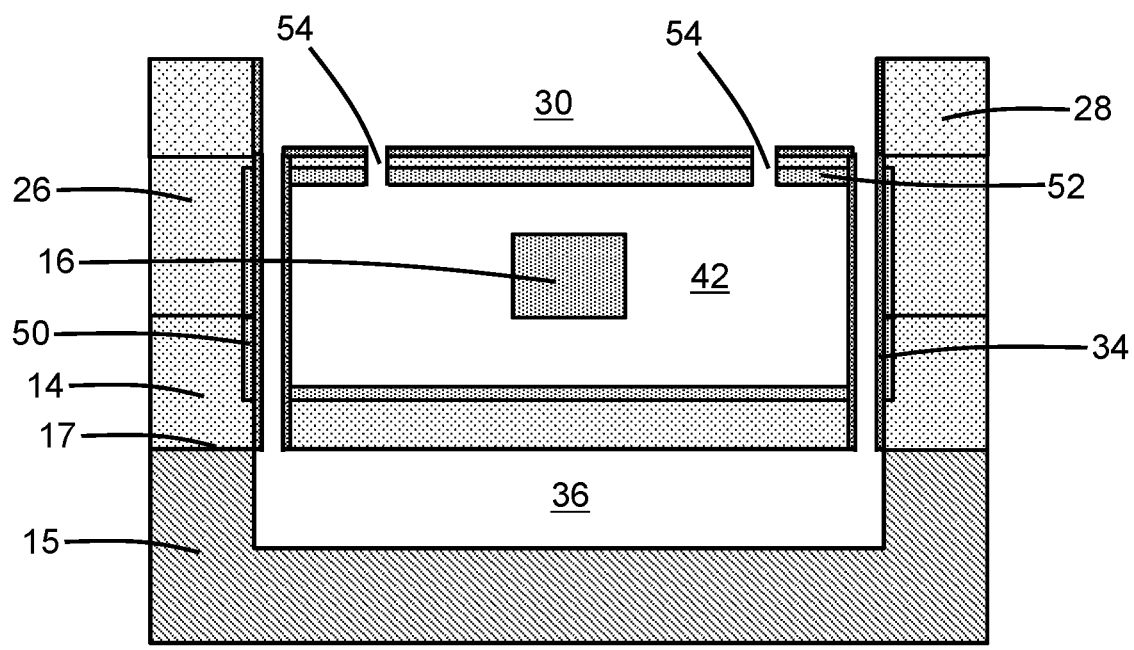

With reference to FIG. 11 in which like reference numerals refer to like features in FIG. 10 and at a subsequent fabrication stage, passages 54 may be patterned in the dielectric layers 26, 34, 52 by lithography and etching processes, and the removable layers 12, 24 may be removed by the activation treatment through the passages 54 in order to form the cavities 42. The passages 54 provide access to the removable layers 12, 24 that is blocked from below by the residual portion of the dielectric layer 14. A barrier layer (not shown) comprised of a dielectric material, such as silicon nitride, may be formed to obstruct the passages 54 after the cavities 42 are formed. The cavities 42 may exclusively define the airgaps surrounding the sides 45, 46, 47, 48 (FIG. 2) of the different portions of the waveguide core 16, and the cavities 36 are isolated from the airgaps defined by the cavities 42 by the intervening residual portion of the dielectric layer 14. In an embodiment, the airgaps defined by the cavities 42 may be fully positioned above the top surface 17 of the substrate 15 with the residual portion of the dielectric layer 14 positioned between the airgaps and the substrate 15. The airgaps extend through the dielectric layer 26 and partially through the dielectric layer 14.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a substrate;
a first dielectric layer over the substrate;
a waveguide core over the substrate, the waveguide core including a plurality of sides;
a first airgap that extends at least partially through the first dielectric layer and that surrounds the plurality of sides of a first portion of the waveguide core;
a second airgap surrounding the plurality of sides of a second portion of the waveguide core;
a first dielectric pillar extending from the substrate to a third portion of the waveguide core;
a second dielectric pillar extending from the substrate to a fourth portion of the waveguide core; and
a third airgap that extends at least partially through the first dielectric layer and that surrounds the plurality of sides of a fifth portion of the waveguide core,
wherein the first portion of the waveguide core and the first airgap are longitudinally arranged between the first dielectric pillar and the second dielectric pillar, the first dielectric pillar is longitudinally arranged between the first airgap and the second airgap, the second dielectric pillar and the fourth portion of the waveguide core are longitudinally arranged between the second airgap and the third airgap, the first airgap is isolated from the second airgap by the first dielectric pillar, and the first airgap is isolated from the third airgap by the second dielectric pillar.

2. The structure of claim 1 wherein the waveguide core includes a longitudinal axis, and the first dielectric pillar, the second dielectric pillar, the first airgap, and the second airgap are arranged along the longitudinal axis of the waveguide core.

3. The structure of claim 1 wherein the first dielectric pillar surrounds the plurality of sides of the third portion of the waveguide core.

4. The structure of claim 1 wherein the plurality of sides of the waveguide core include a bottom side, and the first dielectric pillar adjoins the bottom side of the waveguide core.

5. The structure of claim 1 wherein the plurality of sides include a bottom side, a top side opposite from the bottom side, a first lateral side, and a second lateral side opposite from the first lateral side, and the bottom side connected to the top side by the first lateral side and the second lateral side, and the first airgap surrounds the bottom side, the top side, the first lateral side, and the second lateral side.

6. The structure of claim 1 further comprising:
a light source positioned adjacent to the waveguide core, the light source configured to provide light in a mode propagation direction toward the waveguide core.

7. The structure of claim 1 wherein the substrate has a top surface, and the first airgap includes a first portion positioned above the top surface of the substrate.

8. The structure of claim 7 wherein the first airgap includes a second portion positioned below the top surface of the substrate.

9. The structure of claim 8 wherein the second airgap includes a first portion positioned above the top surface of the substrate.

10. The structure of claim 9 wherein the second airgap includes a second portion positioned below the top surface of the substrate.

11. The structure of claim 10 wherein the substrate includes a first portion beneath the first dielectric pillar and a second portion beneath the second dielectric pillar, the first portion of the substrate supports the first dielectric pillar, and the second portion of the substrate supports the second dielectric pillar.

12. The structure of claim 1 wherein the first airgap extends partially through the first dielectric layer, and further comprising:
    a second dielectric layer disposed on the first dielectric layer,
    wherein the first dielectric layer and the second dielectric layer surround the first airgap and the plurality of sides of the first portion of the waveguide core.

13. The structure of claim 1 wherein the first airgap extends fully through the first dielectric layer, and further comprising:
    a second dielectric layer on the first dielectric layer,
    wherein the first dielectric layer, the second dielectric layer, and the substrate surround the first airgap and the plurality of sides of the first portion of the waveguide core.

14. The structure of claim 1 wherein the waveguide core includes a tapered section, and the tapered section includes the first portion of the waveguide core.

15. A method comprising:
    forming a waveguide core over a substrate, wherein the waveguide core includes a plurality of sides, and a dielectric layer is positioned over the substrate;
    forming a first airgap that extends at least partially through the dielectric layer and that surrounds the plurality of sides of a first portion of the waveguide core;
    forming a second airgap surrounding the plurality of sides of a second portion of the waveguide core;
    forming a first dielectric pillar extending from the substrate to a third portion of the waveguide core;
    forming a second dielectric pillar extending from the substrate to a fourth portion of the waveguide core; and
    forming a third airgap that extends at least partially through the dielectric layer and that surrounds the plurality of sides of a fifth portion of the waveguide core,
    wherein the first portion of the waveguide core and the first airgap are longitudinally arranged between the first dielectric pillar and the second dielectric pillar, the first dielectric pillar is longitudinally arranged between the first airgap and the second airgap, the second dielectric pillar and the fourth portion of the waveguide core are longitudinally arranged between the second airgap and the third airgap, the first airgap is isolated from the second airgap by the first dielectric pillar, and the first airgap is isolated from the third airgap by the second dielectric pillar.

16. The method of claim 15 wherein forming the first airgap surrounding the plurality of sides of the first portion of the waveguide core comprises:
    surrounding the first portion of the waveguide core with an energy removal film material; and
    removing the energy removal film material to form the first airgap.

17. The method of claim 15 further comprising:
    removing a portion of the substrate to define a cavity beneath the waveguide core,
    wherein the cavity provides a contribution to enlarge the first airgap.

* * * * *